(12) United States Patent
Hotta et al.

(10) Patent No.: US 7,891,870 B2
(45) Date of Patent: Feb. 22, 2011

(54) TEMPERATURE SENSOR ELEMENT AND METHOD OF MANUFACTURING THE SAME

(75) Inventors: Nobuyuki Hotta, Konan (JP); Kazushige Ohbayashi, Nagoya (JP)

(73) Assignee: NGK Spark Plug Co., Ltd. (JP)

( * ) Notice: Subject to any disclaimer, the term of this patent is extended or adjusted under 35 U.S.C. 154(b) by 0 days.

(21) Appl. No.: 12/111,405

(22) Filed: Apr. 29, 2008

(65) Prior Publication Data
US 2009/0268779 A1    Oct. 29, 2009

(51) Int. Cl.
*G01K 7/00* (2006.01)
(52) U.S. Cl. ..................... 374/179; 374/208
(58) Field of Classification Search ............ 374/179, 374/208
See application file for complete search history.

(56) References Cited

U.S. PATENT DOCUMENTS

| | | | | |
|---|---|---|---|---|
| 4,984,904 | A | 1/1991 | Nakano et al. | 374/139 |
| 5,696,348 | A * | 12/1997 | Kawamura et al. | 136/230 |
| 2001/0002201 | A1 * | 5/2001 | Kita et al. | 374/140 |

FOREIGN PATENT DOCUMENTS

| | | |
|---|---|---|
| JP | 57094622 A * | 6/1982 |
| JP | 9061251 | 3/1997 |
| JP | 10325759 | 12/1998 |
| JP | 2000266609 | 9/2000 |
| JP | 2001050822 | 2/2001 |
| JP | 2002168700 | 6/2002 |
| JP | 2002214051 | 7/2002 |
| JP | 2002214052 | 7/2002 |
| JP | 2002223009 | 8/2002 |
| JP | 2003004538 | 1/2003 |
| JP | 2003521118 | 7/2003 |
| JP | 2003344170 | 12/2003 |

* cited by examiner

*Primary Examiner*—Lisa M Caputo
*Assistant Examiner*—Mirellys Jagan
(74) *Attorney, Agent, or Firm*—Kusner & jaffe

(57) ABSTRACT

A temperature sensor element 10 has a reduced thermal conduction path from a measurement object to a sensitive end portion 22 of a thermocouple 21 and a high-dense insulating ceramic base body 20. Since the temperature sensor element 10 has excellent thermal conductivity from the measurement object to the sensitive end portion 22 of the thermocouple 21, it is also excellent in responsiveness at the time of temperature detection. Further, corrosion and material deterioration of the thermocouple 21 is unlikely to occur because the thermocouple 21 does not directly contact the measurement object (exhaust gas). As a result, the temperature sensor element 10 exhibits excellent durability. Therefore, the temperature sensor element 10 exhibits a good responsiveness at the time of temperature detection as well as excellent durability.

8 Claims, 2 Drawing Sheets

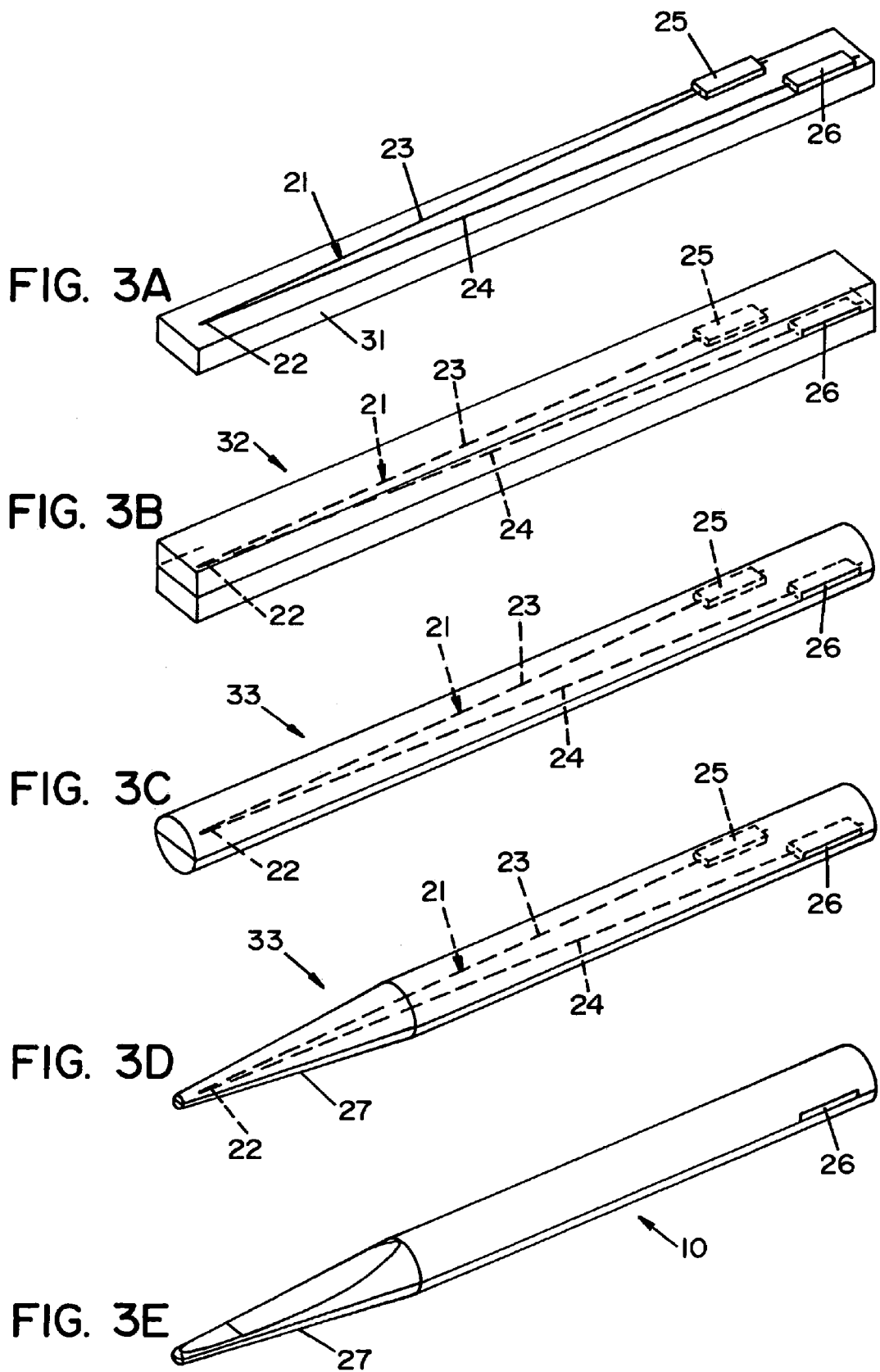

TEMPERATURE SENSOR ELEMENT AND METHOD OF MANUFACTURING THE SAME

BACKGROUND OF THE INVENTION

The present invention relates to a method for manufacturing a temperature sensor element comprised of a lengthy sintered body which extends in an axial direction and is made of insulating ceramic, a sensitive member embedded in the sintered body and a signal output portion for outputting an electric signal received from the sensitive member to the outside.

Conventionally, it has been known that a temperature sensor element has a structure in which a sensitive member is accommodated in a protective tube, such as a metal sheath, a case and a metal tube (see Patent Documents 1, 2 and 3). Such a temperature sensor element detects temperature in such a manner that the temperature of a measurement object conducts and reaches to a sensitive member through the protective tube.

Further, another disclosed temperature sensor element has a structure in which an electrically conductive layer used as the sensitive member is exposed (see Patent Document 4). Such a temperature sensor element detects temperature in such a manner that the electrically conductive layer is directly in contact with a measurement object.

These temperature sensor elements are used for, for example, detecting an exhaust gas temperature of an internal combustion engine, or for detecting temperature of aerospace instruments.

[Patent Document 1] Japanese Patent Application Laid-Open (kokai) No. H10-325759 (FIG. 2)
[Patent Document 2] Japanese Patent Application Laid-Open (kokai) No. 2002-168700 (FIG. 1)
[Patent Document 3] Japanese Patent Application Laid-Open (kokai) No. 2000-266609 (FIG. 2)
[Patent Document 4] Japanese Patent Application based on International Application No. 2003-521118 (Claim 1).

SUMMARY OF THE INVENTION

However, the conventional temperature sensor element having a structure where a sensitive member is accommodated in a protective tube tends to have a problem that responsiveness at the time of temperature detection is likely to deteriorate. This problem is caused by an air layer formed between the sensitive member and the protective tube, or a delay of thermal conduction due to heat capacity of the protective tube or the like.

A technique for improving the thermal conductivity from the protective tube to the sensitive member using a filler (insulating powders, cement or the like) filled therebetween has been proposed (Patent Documents 1 and 3). However, such a temperature sensor element has the sensitive member whose circumference is covered by two members (a protective tube and a filler). Considering allocation area of these two members, a reduction in a physical distance from the sensitive member to the measurement gas is limited, thereby limiting an improvement in the responsiveness.

On the other hand, a temperature sensor element having an exposed sensitive member is directly in contact with a measurement object whereby the responsiveness is excellent. However, the temperature sensor element having the exposed sensitive member tends to cause a variation of output due to material deterioration (i.e., a soot adhesion to the sensitive member or corrosion thereof or the like). As a result, durability of the temperature sensor element tends to be a problem.

The present invention is accomplished in view of the foregoing problems of the prior arts, and an object of the present invention is to provide a temperature sensor element having a good responsiveness at the time of temperature detection and excellent in durability. Also, another object is to provide a method for manufacturing such temperature sensor.

In order to solve the above problems, a first aspect of the present invention is to provide a temperature sensor element, comprising: a lengthy sintered body extending in an axial direction and made of insulating ceramic; a sensitive member embedded in the sintered body; and a signal output portion formed on a rear end side of the sintered body and outputting an electric signal received from the sensitive member to the outside, wherein the sensitive member is comprised of a thermocouple embedded in the sintered body in a state that a detection end portion is disposed on a front end side of the sintered body in the axial direction, and wherein the sintered body is in contact with the detection end portion of the sensitive member and is a dense material which has gas impermeability in a region from an outer face of the sintered body to the sensitive member.

The temperature sensor element has a configuration that the sintered body is in contact with the detection end portion of the sensitive member (thermocouple), and other members (a filler or the like) do not intervene between the sintered body and the sensitive member. Thus, the temperature sensor element of the present invention can promptly transmit the temperature of a measurement gas to the sensitive member compared to a conventional temperature sensor element having a structure that a sensitive member is covered by two members (a protective tube and a filler).

Moreover, the temperature sensor element of the present invention is comprised of the sensitive member (thermocouple) embedded in the sintered body and is the dense material which has gas impermeability in the region from the outer face of the sintered body to the sensitive member. Thus, the sensitive member is not directly in contact with the measurement gas whereby material deterioration (oxidation, sublimation, or corrosion or the like of a material) of the sensitive member is unlikely to occur. As a result, the temperature sensor element has excellent durability. Specifically, when the thermocouple is made of tungsten or an alloy containing tungsten as a principal component, oxidation of the thermocouple can be prevented and excellent durability can be demonstrated.

According to the present invention, the temperature sensor element having a good responsiveness at the time of temperature detection, as well as being excellent in durability can be achieved.

In this specification, "dense material which has gas impermeability" means that an output value under a specific temperature obtained from the temperature sensor element does not fluctuate 10% or more with respect to an initial value (output value under a specific temperature obtained from the temperature sensor element before a heat treatment described below), after the temperature sensor element is subjected to a heat treatment where the temperature sensor element is continuously exposed in the air at 1000° C. for 300 hours.

Moreover, in the above-mentioned temperature sensor, the sintered body may have porosity of 10% or less in a region from a front end thereof to a portion where the detection end portion is embedded in the axial direction.

By forming the high-dense sintered body having the porosity of 10% or less in the region from the front end thereof to the portion where the detection end portion is embedded in the axial direction, thermal conductivity to the sensitive element (i.e., thermocouple) through the sintered body can be further improved. Therefore, according to the present invention, the responsiveness at the time of temperature detection can be further improved. In addition, considering further improvement in responsiveness at the time of temperature detection, the porosity is preferably further reduced (e.g., 5% or less).

In this specification, the "porosity" is calculated based on a cross-sectional photograph (SEM photograph) of the sintered body taken in a predetermined magnification (i.e., 500 times for the sintered body containing alumina as a principal component, 1000 times for the sintered body containing silicon nitride as a principal component) using a scanning electron microscope. The cross section of the sintered body is produce in such a manner that a region from the front end of the sintered body in the axial direction to the portion where the detection end portion is embedded is cut out, and the thus-cut out sintered body is then cut along the axial direction.

More particularly, the "porosity" is determined by calculating a percentage of the gross area of the pore to an SEM photograph area with reflection electron image.

In the above-mentioned temperature sensor element, the thermocouple made of tungsten or an alloy containing tungsten as a principal component can be used.

That is, tungsten has a high melting point and exhibits high temperature durability under reduction atmosphere, inert atmosphere, or vacuum atmosphere. Therefore, by using the thermocouple made of tungsten or the alloy containing tungsten as a principal component, the temperature sensor excellent in durability under the high temperature environment is achievable.

For example, even when the thermocouple is exposed under the high temperature, such as at 1500 to 1850° C., during the manufacturing steps of the temperature sensor element, the thermocouple is unlikely to melt because it is made of tungsten or the alloy containing tungsten as a principal component.

Further, in the above-mentioned temperature sensor element, the thermocouple including at least an alloy-made negative leg which contains tungsten and rhenium where the rhenium content is greater than that of a positive leg may be used.

Since the alloy containing tungsten and rhenium has low vulnerability and excellent durability compared to tungsten as a simple substance, the thermocouple made of such alloy is excellent in durability, and a disconnection due to a breakage of the thermocouple is unlikely to occur.

Since the thermocouple is comprised of the negative leg where the rhenium content thereof is greater than that of the positive leg, it is unlikely to spoil the original function (temperature detection function) of the thermocouple. It is needless to say that the positive leg may be made of tungsten as a simple substance, or an alloy containing tungsten and rhenium.

Therefore, according to the present invention, since the temperature sensor element includes the thermocouple excellent in durability, the temperature sensor element having further excellent durability is achievable.

Next, in the above-mentioned temperature sensor element, the sintered body may be made of insulating ceramic containing silicon nitride or alumina as a principal component.

Since silicon nitride and alumina are excellent in durability under the high temperature environment, the sintered body made of insulating ceramic containing one of these materials as a principal component is excellent in durability under the high temperature environment.

Therefore, the temperature sensor element having such sintered body exhibits further excellent durability.

Next, in the temperature sensor element, the sintered body may have a composition that, in the cross section perpendicular to the axial direction, a cross-sectional area of a portion where the detection end portion of the thermocouple is embedded is smaller than that of a portion where the signal output portion of the thermocouple is formed.

When the sintered body has the small cross-sectional area of the portion where the detection end portion of the thermocouple is embedded, both physical distance and required time for conducting heat between the measurement object and the sensitive member (thermocouple) can be reduced.

Therefore, according to the temperature sensor element of the present invention, since the require time for conducting heat can be reduced, further improvement in responsiveness at the time of temperature detection is attainable.

Also, in the above-mentioned temperature sensor element, the sintered body can be constituted that, for example, the portion where the detection end portion of the thermocouple is embedded may assume a plate-like shape in the cross-section perpendicular to the axial direction.

The portion assuming the plate-like shape in the cross section is a generally rectangular shape having long sides and shorter sides. In this way, without requiring complicated processing or the like to the sintered body, the cross-sectional area of the portion where the detection end portion of the thermocouple is embedded can be made smaller than that of the portion where the signal output portion is formed so as to improve the responsiveness.

In order to solve the above-mentioned problems, a method for manufacturing the temperature sensor element according to the present invention, comprising: a lengthy sintered body extending in an axial direction and made of insulating ceramic; a thermocouple embedded in the sintered body; and a signal output portion outputting an electric signal to the outside according to an electromotive force of the thermocouple, the method comprising, the steps of: forming an unsintered body made of an insulating ceramic before firing and in which the thermocouple is embedded; and forming a dense sintered body which has gas impermeability in a region from an outer surface of the sintered body to the thermocouple.

In the method for manufacturing the temperature sensor element, the unsintered body where the thermocouple is embedded is produced, and the thus-produced body is then fired to thereby form the dense sintered body having gas impermeability in the region from the outer surface of the sintered body to the thermocouple. Thus, it is possible to obtain the temperature sensor element with an improved adhesion between the sintered body and the thermocouple compared to a sintered body where the thermocouple is disposed after firing.

Thus, the temperature sensor element manufactured in according to the present invention provides an improved adhesion between the sintered body and the thermocouple. As a result, thermal conductivity between the sintered body and the thermocouple is improved, thereby achieving excellent responsiveness.

Moreover, the temperature sensor element produced according to the method of the present invention can prevent deterioration of the thermocouple due to corrosion thereof or the like because the measurement gas is unlikely to permeate into the sintered body, and the thermocouple does not directly contact with the measurement gas.

Therefore, according to the method of the present invention, it is possible to produce the temperature sensor element excellent in durability as well as having good responsiveness at the time of temperature detection.

BRIEF DESCRIPTION OF THE DRAWINGS

FIGS. 3A-3E are explanatory views showing each stage of manufacturing steps for a temperature sensor element according to the present invention.

DETAILED DESCRIPTION OF PREFERRED EMBODIMENTS

The embodiment of the present invention will be described with reference to the drawings.

Figure 1:
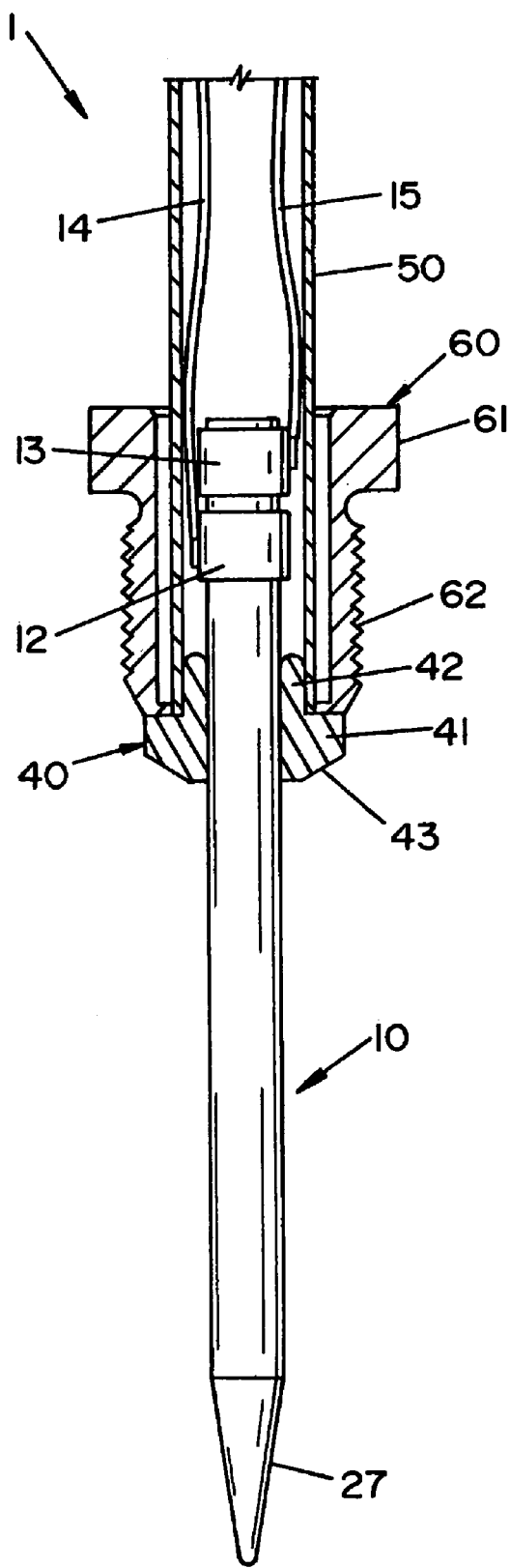
FIG. 1 is a partially sectional view of a temperature sensor having a temperature sensor element according to the present invention.

First, a partially sectional view of a temperature sensor 1 having a temperature sensor element 10 according to an embodiment of the present invention is shown in FIG. 1.

It is noted that the temperature sensor 1 is used for a temperature detection of an exhaust gas. The temperature sensor 1 is located at both front and rear sides of an exhaust port of an automobile, particularly, an exhaust gas after treatment device of a diesel engine. A front end portion of the temperature sensor element 10 is disposed in the exhaust port where an exhaust gas flows.

As shown in FIG. 1, the temperature sensor 1 is comprised of the temperature sensor element 10, a flange member 40, a joint member 50 and a nut member 60.

The lengthy temperature sensor element 10 extends in an axial direction and has therein a thermocouple 21 (refer to FIG. 2) for detecting a temperature. Further, the flange member 40 is a metal member provided so as to cover a rear end side circumference of the temperature sensor element 10. The joint member 50 made of a stainless steel assumes a cylindrical form and is engaged with the flange member 40. Furthermore, the nut member 60 is engaged with the flange member 40 to cover a front end portion of the joint member 50 which is in contact with the flange member 40. The nut member 60 is used for fixing the temperature sensor 1 in a predetermined position (an exhaust port in this embodiment).

The flange member 40 encloses a rear end side circumference (upper side in FIG. 1) of the temperature sensor element 10 and is comprised of: a sheath 42 extending at the rear end side in the axial direction; and a projecting portion 41 located at the front end side (lower side in FIG. 1) of the sheath 42 and radially projecting towards the outside. The projecting portion 41 assumes an annular shape and includes a tapered seat face 43 at the front end side thereof which corresponds to a tapered portion of a fitting portion of the exhaust port (not illustrated). The seat face 43 adheres to the tapered portion of the fitting portion, thereby preventing an exhaust gas from leaking out from the exhaust port to the outside.

Further, the nut member 60 having a hexagonal nut portion 61 and a thread portion 62 is fitted to a circumference of the flange member 40 in a rotatable manner. The temperature sensor 1 is fixed by the nut member 60 in a state where the seat face 43 of the projecting portion 41 of the flange member 40 is in contact with the fitting portion of the exhaust port.

Furthermore, the cylindrical joint member 50 is joined to the radially outside of the sheath 42 of the flange members 40 in an airtight manner. More particularly, the joint member 50 is press fitted into the sheath 42 so that the outer circumference face of the sheath 42 and an inner circumference face of the joint member 50 are overlapped. Then, the flange member 40 and the joint member 50 are joined in the airtight manner by laser welding the circumference of the joint member 50 and the sheath 42.

Moreover, the outer circumference of the temperature sensor element 10 is adhered to and held by the inner circumference of the sheath 42 of the flange member 40, and two electrode rings 12, 13 provided in the rear end portion of the temperature sensor element 10 are exposed inside of the joint member 50. A pair of leads 14 and 15 for connecting to an external circuit (e.g., electrical control unit (ECU) of a vehicle or the like) is joined to each electrode ring 12 and 13, respectively, and kept inside of the joint member 50. These two leads 14, are made of a stranded wire, which is comprised of a stainless alloy conductor wire and a copper conductor wire, covered with an insulating cover material, or a temperature compensating conductor wire suitable for the thermocouple 21. The leads 14, are inserted in an auxiliary ring made of heat-resistant rubber (not illustrated) provided in a rear end side opening of the joint member 50.

Figure 2:
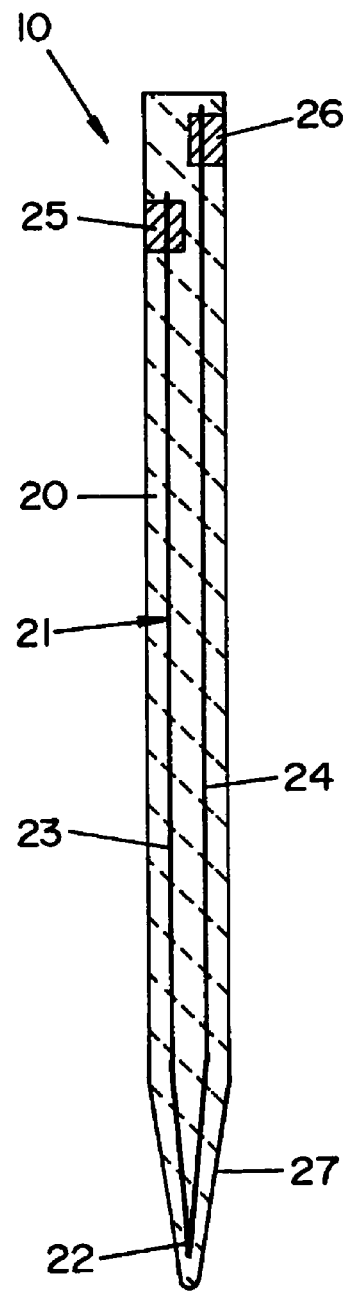
FIG. 2 is a sectional view showing an internal configuration of a temperature sensor element according to the present invention.

Next, the temperature sensor element 10 will be described with reference to FIG. 2. In addition, FIG. 2 is a sectional view showing an internal configuration of the temperature sensor element 10.

The temperature sensor element 10 is comprised of: a columnar insulating ceramic base body 20; the thermocouple 21 embedded in the insulating ceramic base body 20; and electrode extraction portions 25 and 26 formed in a rear end side of the insulating ceramic base body 20.

The insulating ceramic base body 20 is made of insulating ceramic containing silicon nitride, alumina or "Si-A-l-O—N" (a ceramic material made of silicon nitride and alumina) as a principal component and having high thermal conductivity and good corrosion resistance. The insulating ceramic base body 20 also includes a tapered portion 27 where a cross-sectional area thereof is reduced towards the front end direction.

In addition, the "principal component" in this embodiment means a component which occupies 70 weight % or more to all contained components.

The thermocouple 21 is embedded in the insulating ceramic base body 20 in a state where a sensitive end portion 22, which is a connection of a positive leg 23 and a negative leg 24, is provided in a front end side inner portion of the insulating ceramic base body 20, and where each rear end side end portion of the positive leg 23 and the negative leg 24 is connected to the electrode extraction portions 25, 26, respectively.

The positive leg 23 of the thermocouple 21 is made of tungsten-rhenium alloy (W—Re5%) containing rhenium of 5%. The negative leg 24 is made of tungsten-rhenium alloy (W—Re26%) containing rhenium of 26%.

The electrode extraction portions 25, 26 are made of conductive ceramic material containing conductive composite material as a principal component, which is comprised of silicon nitride or SiAlON, and at least one or more kind(s) of substances selected from metal boride, carbide, nitride and silicide. Further, at least a part of each electrode extraction portion 25, 26 is exposed on the outer circumference face of the insulating ceramic base body 20 so as to be electrically connected to the electrode rings 12, 13, respectively.

In the insulating ceramic base body 20, the electrode extraction portion 25 is located at the front end side with respect to the electrode extraction portion 26.

In the temperature sensor element 10 having such a configuration, electromotive force is generated in the thermocouple 21 according to a detected temperature by the sensitive end portion 22, and then, a voltage signal corresponding to the detected temperature is output from the electrode extraction portions 25, 26 to the outside.

Returning to FIG. 1, the electrode rings 12, 13 are conductive metal members inserted in the rear end side of the insulating ceramic base body 20. The electrode ring 12 is located at the front end side with respect to the electrode ring 13 in the axial direction. The inner circumference of the electrode ring 12 is electrically connected to the electrode extraction portion 25, and that of the electrode ring 13 is electrically connected to the electrode extraction portion 26.

Furthermore, the leads 14, 15 for external circuit connection are connected to the outer circumference of the electrode rings 12, 13 by ultrasonic welding or the like. A voltage signal generated by the thermocouple 21 is output to an external circuit (e.g., ECU) through the electrode rings 12, 13 and the leads 14, 15.

Next, a method for manufacturing the temperature sensor element 10 of the temperature sensor 1 will be described.

First, a step for producing a powder mixture serving as a raw material of the insulating ceramic base body 20 is conducted.

More particularly, material powder of 86.0 parts by weight, which contains silicon nitride, alumina or SiAlON with a mean grain size of about 1.0 μm is wet-mixed with erbium oxide of 8.0 parts by weight, vanadium oxide of 1.0 parts by weight, tungsten oxide of 2.0 parts by weight and molybdenum disilicide of 3.0 parts by weight, those of which serve as sintering aids, in a ball mill for 40 hours. After adding a binder, the resultant mixture is prepared by a splay-dry method into a powder mixture.

Next, a step for producing a printing ink used as a raw material for the electrode extraction portions 25, 26 is conducted.

More particularly, tungsten carbide material powder of 61.3 parts by weight with a mean grain size of 0.5 μm and silicon nitride material powder of 33.0 parts by weight with a mean grain size of 1.0 μm are wet-mixed with erbium oxide of 3.8 parts by weight and silicon dioxide of 1.9 parts by weight, both of which serve as sintering aids, in a ball mill for 40 hours. Then, a binder is added to the resulting mixture to thereby produce the printing ink.

Explanatory views showing each stage of manufacturing steps of the temperature sensor element 10 is shown in FIGS. 3A-3E.

After producing the above-mentioned powder mixture and the printing ink, the powder mixture is subjected to a press process using a metal mold for molded half body to thereby form a molded half body 31. The molded half body 31 is half the size of insulating ceramic base body 20 in the axial direction. The thermocouple 21 is disposed on a surface of the molded half body 31, and the printing ink is applied thereto to form the electrode extraction portions 25, 26 (refer to FIG. 3A).

Next, the above-mentioned powder mixture is disposed on the molded half body 31 having dried electrode extraction portions 25, 26 (printing ink) so as to cover the thermocouple 21 and the electrode extraction portions 25, 26. Thereafter, they are subjected to a press process using a metal mold for an integrated mold body to thereby form an integrated mold body 32 serving as the insulating ceramic base body 20 (refer to FIG. 3B. The integrated mold body 32 is disposed in a nitrogen atmosphere and subjected to a debinder-treatment at 800° C. for over 1 hour.

In addition, FIG. 3B is a perspective view of the integrated mold body 32 where the thermocouple 21 and the electrode extraction portions 25, 26 are embedded therein.

The integrated mold body 32 is fired (sintered) at 1650° C. for 60 minutes by hot pressing with a pressing pressure of 30 Mpa. Thereafter, the integrated mold body 32 is subjected to a centreless grinding to thereby form a round bar-shaped sintered element body 33 (refer to FIG. 3C).

In addition, FIG. 3C is a perspective view of the sintered element body 33 where the thermocouple 21 and the electrode extraction portions 25, 26 are embedded therein.

Subsequently, a front end of the sintered element body 33 is ground so that a cross-sectional area thereof is tapered off towards the front end to thereby form a tapered portion 27 (refer to FIG. 3D).

In addition, FIG. 3D is a perspective view of the sintered element body 33 where the thermocouple 21 and the electrode extraction portions 25, 26 are embedded therein.

Further, the tapered portion 27 of the sintered element body 33 is subjected to another grinding step to thereby assume a plate-like shape in the cross-section perpendicular to the axial direction. Finally, the temperature sensor element 10 is completed (refer to FIG. 3E).

As described above, the thus-produced temperature sensor element 10 is assembled with other members, such as the electrode rings 12, 13, the flange member 40, the nut member 60 to thereby complete the temperature sensor 1.

In the temperature sensor element 10 manufactured as described above, since the insulating ceramic base body 20 is produced by firing the integrated mold body 32 where the thermocouple 21 is embedded therein, the insulating ceramic base body 20 is in contact with the generally entire circumference of the sensitive end portion 22 of the thermocouple 21.

That is, the temperature sensor element 10 has a configuration where the insulating ceramic base body 20 adheres to the sensitive end portion 22 of the thermocouple 21. Thus, the temperature sensor element 10 has the configuration where no other member intervene between the insulating ceramic base body 20 and the sensitive end portion 22 of the thermocouple 21 at the time of thermal conduction, thereby reducing a thermal conduction path compared to a conventional temperature sensor.

Furthermore, in the insulating ceramic base body 20, when the cross-section of a portion where the sensitive end portion 22 of the thermocouple 21 is embedded (the tapered portion 27) is formed into a plate-like shape, a cross-sectional area of the tapered portion 27 is smaller than that of a portion where the electrode extraction portions 25 and 26 are formed. Thus, the temperature sensor element 10 has a reduced thermal conduction path from a measurement object to the sensitive end portion 22 of the thermocouple 21.

Moreover, the fired (sintered) insulating ceramic base body 20 as mentioned above has gas impermeability in a region from an outer surface of the insulating ceramic base body 20 to the sensitive end portion 22 of the thermocouple 21. The insulating ceramic base body 20 is formed to be a high-dense material where pores hardly exist therein. In addition, when many pores exist in an insulating ceramic, shock resistance and thermal conductivity thereof deteriorates. However, when the insulating ceramic is a dense material, the insulating ceramic is likely to have excellent shock resistance and exhibits a reduced an adverse effect on thermal conductivity caused by pores.

That is, the high-dense insulating ceramic has excellent thermal conductivity compared to that of a material having low density (i.e., having high porosity). Therefore, the high-dense insulating ceramic base body 20 is excellent in thermal conductivity.

In addition, when the insulating ceramic base body 20 has porosity of at least 10% or less, it is apparent from an experiment that the insulating ceramic base body 20 exhibits excellent shock resistance and thermal conductivity. Thus, the insulating ceramic base body 20 according to this embodiment has porosity of 10% or less.

Since the tapered portion 27 of the insulating ceramic base body 20 is formed to have high density while the thermal conduction path from a measurement object to the sensitive end portion 22 of the thermocouple 21 is reduced, excellent thermal conductivity is achievable. Thus, the temperature sensor element 10 having such insulating ceramic base body 20 exhibits excellent responsiveness at the time of temperature detection.

Further, since the entire thermocouple 21 is embedded in the insulating ceramic base body 20, the thermocouple 21 does not directly contact with a measurement object (exhaust gas). Thus, corrosion and material deterioration of the thermocouple 21 is unlikely to occur whereby the temperature sensor element 10 has excellent durability.

As described above, the temperature sensor element 10 according to this embodiment has the reduced thermal conduction path from a measurement object to the sensitive end portion 22 of the thermocouple 21, as well as having the insulating ceramic base body 20 with high density. Thus, since the temperature sensor element 10 has excellent thermal conductivity from a measurement object to the sensitive end portion 22 of the thermocouple 21, it exhibits excellent responsiveness at the time of temperature detection.

Since the thermocouple 21 is embedded in the insulating ceramic base body 20, and since the insulating ceramic base body 20 is a dense material having gas impermeability in the region from the outer surface of the insulating ceramic base body 20 to the sensitive end portion 22 of the thermocouple 21, the thermocouple 21 does not directly contact with a measurement object (exhaust gas). Thus, the thermocouple 21 (the sensitive end portion 22) is unlikely to be oxidized whereby the temperature sensor element 10 exhibits excellent durability.

Therefore, the temperature sensor element 10 according to this embodiment is advantageous that it has good responsiveness at the time of temperature detection and excellent durability.

Further, in the temperature sensor element 10, the thermocouple 21 comprised of tungsten or an alloy containing tungsten as a principal component is used. Tungsten exhibits an advantageous feature of a high melting point and excellent durability at high temperature whereby the temperature sensor element 10 having such the thermocouple 21 exhibits excellent durability under the high temperature environment.

In the manufacturing steps of the temperature sensor element 10, although the thermocouple 21 is exposed at high temperature in the firing (sintering) step of the integrated mold body 32, the thermocouple 21 exhibits excellent durability at high temperature, thereby preventing the thermocouple 21 from being melt in the firing step.

Furthermore, since an alloy of tungsten and rhenium has low vulnerability and excellent durability compared to tungsten as a simple substance, the thermocouple 21 made of such alloy is excellent in durability, and disconnection due to a breakage of the thermocouple 21 is unlikely to occur.

Moreover, silicon nitride and alumina are the materials excellent in durability under the high temperature environment. The insulating ceramic base body 20 made of either material as a principal component is excellent in durability under the high temperature environment. Therefore, the temperature sensor element 10 having such insulating ceramic base body 20 is excellent in durability under the high temperature environment.

The thermocouple has an advantageous feature that variation of the electromotive force defined by a detected temperature does not occur even thought electrode wires constituting the positive leg and the negative leg each has a different diameter (cross-sectional area).

For this reason, it is not necessary to strictly control the diameters (cross-sectional area) of the positive leg and the negative leg at the time of manufacturing the temperature sensor element. Therefore, it is possible to alleviate the complication in the manufacturing compared to the case where a temperature-sensitive resistor that an electric resistance value changes according to temperature variation is used.

That is, since the resistance value of the temperature-sensitive resistor changes as the diameters (cross-sectional area) of the temperature-sensitive resistor changes, it is necessary to strictly control the diameters (cross-sectional area) of the temperature-sensitive resistor at the time of manufacturing the temperature sensor element in order to prevent an error in the resistance. On the other hand, since it is not necessary to strictly control the diameters (cross-sectional area) of the positive and the negative legs at the time of manufacturing the temperature sensor element, it is possible to alleviate the complication in the manufacturing.

In the above-described embodiment, the insulating ceramic base body 20 is equivalent to a sintered body in the claims, the sensitive end portion 22 of the thermocouple 21 is equivalent to a detection end portion in the claims, and the electrode extraction portions 25, 26 are equivalent to signal output portions in the claims.

The present invention is not particularly limited to the embodiments described above but may be changed or modified in various ways.

For example, the thermocouple is not necessarily constituted by the positive leg made of W—Re5% alloy and the negative leg made of W—Re26% alloy. The content of rhenium (Re) can be an arbitrary value. It is noted that the thermocouple may include the negative leg having greater rhenium content than the rhenium content in the positive leg.

Alternatively, the thermocouple may include the positive leg made of tungsten not containing rhenium and the negative leg made of tungsten containing rhenium.

Although the temperature sensor element 10 according to the above-mentioned embodiment has the insulating ceramic base body 20 whose front end face assumes a circular shape, the insulating ceramic base body may be formed so that the front end face thereof assumes a rectangular shape (i.e., the same shape as the front end portion of a flathead screwdriver).

Moreover, as for a sintering method of the integrated mold body 32, it is not limited to a hot press (HP), but a pressureless sintering (PLS), a gas-pressure sintering (GPS), hot isostatic press (HIP), or a combination of these sintering may be used.

It is preferable that no crystal phase of rare-earth-elements (hereafter referred to as "RE")—Si—O—N is deposited to a grain boundary phase of the insulating ceramic base body (sintered body). That is, one of the crystal phases of RE-Si—O and RE-Si—Al—O, which is amorphous or does not contain nitrogen, is preferably deposited to the grain boundary phase of the sintered body. In this way, the oxidation resistance of the sintered body can be improved. Since oxidization corrosion of the insulating ceramic base body 20 is not unlikely to occur even when the temperature sensor 1 is used for a long time, the thermocouple 21 is unlikely to be exposed due to the thin-down insulating ceramic base body 20.

Furthermore, the entire shape of the insulating ceramic base body 20 of the temperature sensor element 10 is not limited to the shape shown in FIG. 3E, but the cross-sectional shape of the insulating ceramic base body may assume either a circular shape, an elliptical shape or a polygonal shape, such as quadrangle, and extend in the axial direction. Furthermore, although the thermocouple of the temperature sensor element 10 in the above-mentioned embodiment is made of a wire containing a tungsten alloy, it may be made in such a manner that an unsintered insulating ceramic base body is simultaneous fired with a conductive paste containing tungsten alloy powder, and thereafter, the thermocouple is embedded in the insulating ceramic base body. When the conductive paste is used as mentioned above, the conductive paste may be applied to the unsintered insulating ceramic base body with a predetermined pattern, or predetermined score lines are formed in the insulating ceramic base body and the conductive paste is filled in the score lines.

Moreover, in order to improve the responsiveness of the temperature sensor element at the time of temperature detection, the porosity of the insulating ceramic base body is preferably set to be in a smaller range (e.g., 5% or less) compared to the above mentioned porosity (10% or less).

The invention claimed is:

1. A temperature sensor element, comprising:
   an elongated and columnar sintered body extending in an axial direction, said sintered body having an outer surface for exposure to a matter to be measured, said sintered body being formed by sintering insulating ceramic material, said sintered body having an outer circumference adhered to and held by an inner side of a metal flange member;
   a sensitive member embedded in the sintered body; and
   a signal output portion formed on a rear end side and on a further rear end side than a region covered by the flange member of the sintered body for outputting an electric signal received from the sensitive member to the outside,
   wherein the columnar sintered body comprises a tapered portion that has a plate-like shape relative to said sensitive end of said thermocouple, and said tapered portion has a cross-sectional area that is reduced towards a front end side of the sintered body in the axial direction;
   wherein the sensitive member is comprised of a thermocouple embedded in the tapered portion of the sintered body in a state that a detection end portion of the thermocouple is disposed in contact with said sintered body on a front end side of the sintered body in the axial direction, and
   wherein the sintered body is in contact with the detection end portion of the sensitive member and is a dense material which has gas impermeability in a region from the outer surface of the sintered body to the sensitive member the sintered body has a configuration that, in a cross section perpendicular to the axial direction, a cross-sectional area of a portion where the detection end portion of the thermocouple is embedded smaller than that of a portion where the signal output portion of the thermocouple is formed; and
   further, in the tapered portion of the sintered body, the portion where the detection end portion of the thermocouple is embedded assumes a plate-like shape in the cross-section perpendicular to the axial direction.

2. A temperature sensor element according to the claim 1, wherein the sintered body has porosity of 10% or less in a region from a front end thereof to a portion where the detection end portion is embedded in the axial direction.

3. A temperature sensor element according to the claim 1, wherein the thermocouple is comprised of tungsten or an alloy containing tungsten as a principal component.

4. A temperature sensor element according to the claim 1, wherein the thermocouple includes at least an alloy-made negative leg containing tungsten and rhenium where the rhenium content is greater than that of a positive leg.

5. A temperature sensor element according to the claim 1, wherein the sintered body is made of insulating ceramic containing silicon nitride or alumina as a principal component.

6. A temperature sensor element according to the claim 1, wherein the sintered body has a configuration that, in the cross section perpendicular to the axial direction, a cross-sectional area of a portion where the detection end portion of the thermocouple is embedded is smaller than that of a portion where the signal output portion of the thermocouple is formed.

7. A temperature sensor element according to the claim 1, wherein, in the sintered body, a portion where the detection end portion of the thermocouple is embedded assuming a plate-like shape in the cross-section perpendicular to the axial direction.

8. A method for manufacturing a temperature sensor element, comprising:
   a lengthy sintered body extending in an axial direction and made of insulating ceramic;
   a thermocouple embedded in the sintered body; and
   a signal output portion outputting an electric signal to the outside according to an electromotive force of the thermocouple,
   the method comprising, the steps of:
      forming unsintered half bodies made of insulating ceramic;
      positioning a thermocouple between said unsintered half bodies, said thermocouple having a positive leg and a negative leg positioned side-by-side and converging to a point that defines a sensitive end portion;
      pressing said half bodies together to form an integrated mold body having said thermocouple embedded therein, wherein said sensitive end portion of said thermocouple is disposed in a front end side of said integrated mold body; firing said integrated mold body to form a dense sintered body which has gas impermeability in a region from an outer surface of the sintered body to the thermocouple;
      grinding the front end side of said sintered body to form a tapered end; and
      grinding said tapered end wherein said front end side of said sintered body assumes a plate-like shape relative to said sensitive end of said thermocouple.

* * * * *